United States Patent
Wijffels et al.

(10) Patent No.: US 10,594,248 B2
(45) Date of Patent: Mar. 17, 2020

(54) ADAPTIVE STEERING TORQUE CONTROL

(71) Applicant: Ford Motor Company, Dearborn, MI (US)

(72) Inventors: Lodewijk Wijffels, Canton, MI (US); Oliver Nehls, Duesseldorf (DE); Timothy Cannon, Millington, MI (US); Cornelius MacFarland, Garden City, MI (US); Joseph Park, St. Clair Shores, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 496 days.

(21) Appl. No.: 15/410,292

(22) Filed: Jan. 19, 2017

(65) Prior Publication Data
US 2018/0201305 A1   Jul. 19, 2018

(51) Int. Cl.
*H02P 29/20* (2016.01)
*B62D 5/04* (2006.01)

(52) U.S. Cl.
CPC ............ *H02P 29/20* (2016.02); *B62D 5/0457* (2013.01); *B62D 5/0481* (2013.01)

(58) Field of Classification Search
USPC .......................................................... 701/41
See application file for complete search history.

(56) References Cited

U.S. PATENT DOCUMENTS

| 6,293,366 B1 | 9/2001 | Chabaan et al. |
| 8,515,622 B2 | 8/2013 | Shah et al. |
| 9,221,494 B2 | 12/2015 | Hestermeyer et al. |
| 2015/0344065 A1* | 12/2015 | Lee ..................... B62D 5/0463 701/41 |
| 2016/0167707 A1 | 6/2016 | Lee |
| 2016/0280255 A1* | 9/2016 | Wilhelm .............. B62D 5/0463 |
| 2017/0029021 A1* | 2/2017 | Lee ..................... B62D 5/0457 |
| 2017/0096166 A1* | 4/2017 | Kataoka ................ B62D 5/008 |

FOREIGN PATENT DOCUMENTS

| CN | 202994349 U | 6/2013 |
| EP | 2316708 A1 | 5/2011 |

* cited by examiner

*Primary Examiner* — James M McPherson
(74) *Attorney, Agent, or Firm* — Vincent Mastrogiacomo; Brooks Kushman P.C.

(57) ABSTRACT

Methods and systems for analyzing and/or calibrating an adaptive steering system are disclosed. One method may include rotating a hub that is configured to engage a steering shaft over a predetermined range of hub angles using a gear and an internal electric motor in response to a control signal. A torque required to rotate the hub as a function of the hub angles may be determined, as well as whether the torque is within a predefined torque window. The method may be used to analyze the overall friction in the adaptive steering wheel assembly. In one embodiment, the method may be performed with the steering wheel assembly fully assembled and the internal electric motor covered and inaccessible. The torque may be determined by calculating the torque based on a current draw of the internal electric motor.

20 Claims, 5 Drawing Sheets

ADAPTIVE STEERING TORQUE CONTROL

TECHNICAL FIELD

The present disclosure relates to adaptive steering torque control, for example, using internal system components.

BACKGROUND

Many current vehicles have power steering systems incorporated therein. In general, power steering assists vehicle drivers steer the vehicle by assisting or supplementing the steering effort required to turn the steering wheel. Power steering systems may use hydraulic or electric actuators (motors) to apply force to the steering mechanism, allowing the driver to use less effort to turn the vehicle wheels when driving at moderate speeds, and to significantly reduce the force needed to turn the wheels at low speeds. The system may have a direct mechanical connection between the steering wheel and the linkage that steers the wheels, such that the vehicle may be steered even if the power steering system fails. While power steering systems reduce the effort needed for the driver to turn the steering wheel, particularly at low speeds, the systems generally have fixed steering gear ratios. This may result in a compromise between providing steering quickness and maneuverability at low speeds and offering comfortable vehicle response at high speeds.

SUMMARY

In at least one embodiment, a method of measuring a torque-to-rotate of an adaptive steering system is provided. The method may include rotating a hub that is configured to engage a steering shaft over a predetermined range of hub angles using a gear and an internal electric motor in response to a control signal; determining a torque required to rotate the hub as a function of the hub angles; and determining whether the torque is within a predefined torque window.

In one embodiment, the predefined torque window is based on a target overall friction in the adaptive steering system. Determining the torque may include calculating the torque based on a current draw of the internal electric motor. The method may include connecting, via an electrical connection, the internal electric motor to a power source external to the adaptive steering system prior to the rotating step to provide power to the internal electric motor. The control signal may be sent via the electrical connection. In one embodiment, the rotating, measuring, and determining steps are performed at an end-of-line (EOL) station on an assembly line. The adaptive steering system may be fully assembled and enclosed during the rotating, measuring, and determining steps.

In one embodiment, the rotating, measuring, and determining steps are performed twice, first at an assembly station and second at an end-of-line (EOL) station on an assembly line. The rotating step may include rotating the hub at least one full rotation in a first direction. After rotating the hub in the first direction, the rotating step may further include rotating the hub at least one full rotation in a second, opposite direction. If the torque is not within the predefined torque window, an alarm or notification may be generated. In one embodiment, the predefined torque window is from 50 to 140 N·mm.

In at least one embodiment, an adaptive steering system is provided. The system may include an internal electric motor and a gear configured to rotate a hub configured to engage a steering shaft; and one or more controllers configured to send a signal to the electric motor to rotate the hub over a predetermined range of hub angles, determine a torque required to rotate the hub as a function of the hub angles, and determine if the torque is within a predefined torque window.

In one embodiment, the gear is a worm gear. The system may include an external, non-vehicle power supply, which may be connected to the internal electric and configured to power the internal electric motor to rotate the hub. The one or more controllers may be configured to send a signal to the internal electric motor to rotate the hub at least one full rotation in a first direction. After rotating the hub in the first direction, the one or more controllers may be configured to send a signal to the internal electric motor to rotate the hub at least one full rotation in a second, opposite direction. In one embodiment, the one or more controllers are configured to send the signal to the internal electric motor to rotate the hub over a predetermined angle, measure the torque required to rotate the hub, and determine if the torque is within the predefined torque window with the internal electric motor enclosed by a steering wheel cover.

In at least one embodiment, an adaptive steering control system is provided. The control system may include one or more controllers configured to: send a signal to an adaptive steering system internal electric motor to rotate a steering shaft hub over a predetermined range of hub angles; determine a torque required to rotate the hub as a function of the hub angles; and determine if the torque is within a predefined torque window.

In one embodiment, the one or more controllers are configured to send a signal to the internal electric motor to rotate the hub at least 30 degrees in a first direction and then to rotate the hub at least 30 degrees in a second, opposite direction.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As described in the Background, power steering systems may reduce the effort needed by a driver to turn the steering wheel. However, their fixed steering gear ratios may require a compromise between low speed and high speed performance. To address this compromise, Applicant has developed adaptive steering systems (also called active steering systems). Active steering systems such as AFS (active front steering) can be used in combination with steering power assist to change steering ratios over speed, steering wheel angle and/or other parameters. Such systems can be electromechanical. The internal friction in such systems may be an important factor for their performance. In general, active/adaptive steering systems include an electric motor, a processor/controller, and a gear unit. The system may adjust the gearing ratio of the steering system based on, for example, driver input and/or vehicle speed. Adaptive steering can add or subtract rotations to driver input at the steering wheel. At low speeds, the system may increase the angle of the front wheels as the steering wheel is turned, resulting in the driver needing to steer less to maneuver. At high speeds, the system may optimize steering response, letting the vehicle react more smoothly to each steering input. One example of an adaptive steering system is described in commonly owned U.S. Pat. No. 8,515,622, the disclosure of which is hereby incorporated in its entirety by reference herein.

Figure 1:
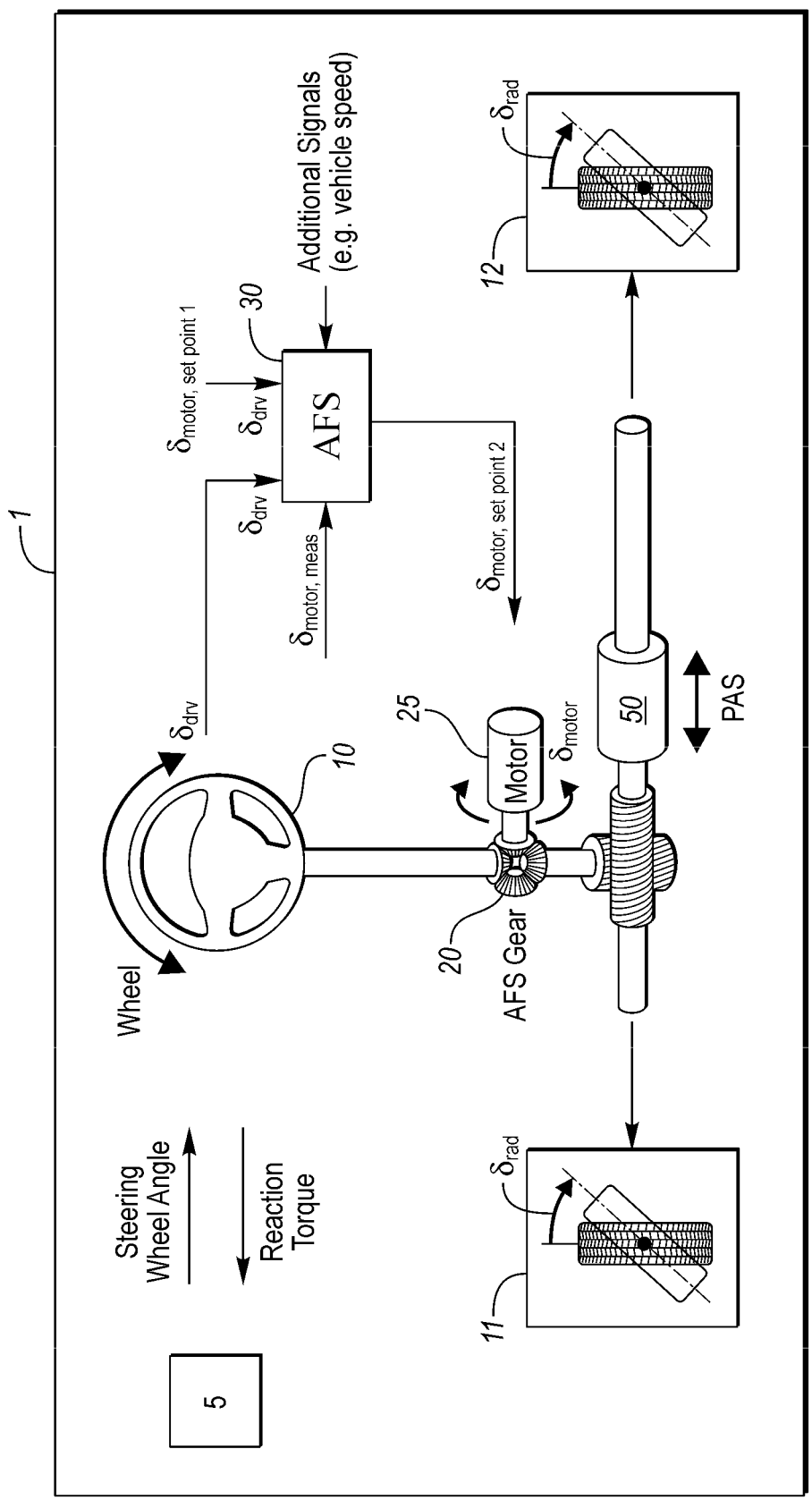
FIG. 1 is a schematic diagram of an adaptive steering system, according to an embodiment.

With reference to FIG. 1, a schematic diagram of an embodiment of an adaptive steering system 1 is provided, in which a method according to the present disclosure can be implemented. However, the system 1 is merely an example of an adaptive steering system and the systems and methods of the present disclosure may be implemented with any adaptive steering system. One of ordinary skill in the art will understand that additions, subtractions, or modifications may be made to the system 1.

As shown, the adaptive steering system 1 may include a gear or gear system 20 (also referred to as a differential or AFS gear) operatively connected to a steering wheel column for a steering wheel 10 than can be actuated by a driver 5. The gear system may include a worm shaft and a worm gear (collectively a worm drive), however, other suitable gear systems may be used, such as a harmonic drive. A superimposition angle or motor angle produced by the gear system 20 can be set via an electric motor 25 (e.g., a hollow shaft motor), which sets a wheel steer angle of a left wheel 11 and a right wheel 12 to a wheel steer angle $\delta_{rad}$ produced by the adaptive steering system 1. The wheel steer angle grad can be expressed as $\delta_{rad}=\delta_{drv}-\delta_{motor}$, where $\delta_{motor}$ is a superimposition motor angle and $\delta_{drv}$ is a driver-selected steering angle.

The gear system 20 can therefore add or subtract a superimposition angle or motor angle $\delta_{motor}$ to or from the driver-selected steering angle $\delta_{drv}$. The sum of the motor angle $\delta_{motor}$ and the driver-selected steering angle $\delta_{drv}$ acts on the steering gear, which produces the wheel steer. $\delta_{drv}$ denotes a steering angle specified by the driver and $\delta_{motor}$ denotes the motor angle, which is produced by the electric motor 25 and is superimposed on the driver steering angle $\delta_{drv}$, via gear system 20. As shown in FIG. 1, a hydraulic or electric power assistance system (PAS) 50 can also be provided to assist the AFS motor 25 in steering the road wheel. Numerous inputs, such as $\delta_{drv}$, $\delta_{motor, meas}$, and/or $\delta_{motor, setpoint}$, may be received by an active/adaptive steering control system or AFS control system 30, which may include a controller, processor, system on chip (SOC), software loaded thereon, and/or other components. The AFS control system 30 may control the adjustment of the gearing ratio of the steering system 1.

Figure 2:
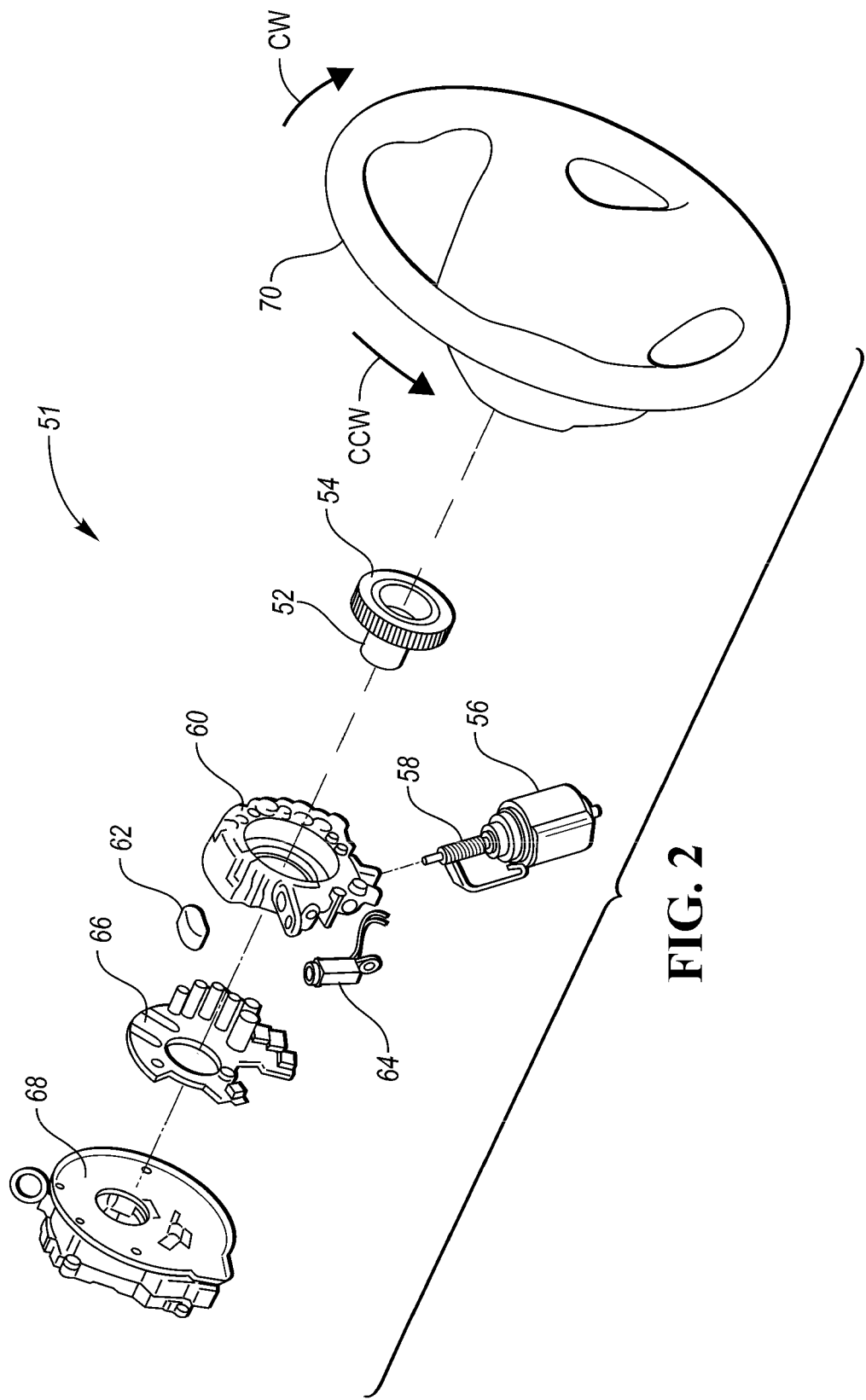
FIG. 2 is an exploded schematic of a steering wheel assembly of an adaptive steering system, according to an embodiment.

With reference to FIG. 2, an exploded view of a steering wheel assembly 51 is shown. The assembly 51 may be used in an adaptive steering system, such as system 1. The assembly may include a steering wheel 70, which may be rotated clockwise or counter-clockwise to steer the wheels of a vehicle. The assembly may also include a hub 52, which may couple to a steering column/shaft (not shown). Rotation of the hub 52 may apply a torque on the steering shaft and the two components may rotate together. As described above, the adaptive steering system may add or subtract steering angle to the driver-selected steering angle based on one or more factors (e.g., vehicle speed).

The hub 52 may be coupled to a gear 54, which may be a worm gear. An electric motor 56 may be configured to engage the gear 54 to turn/rotate the gear 54 and the hub 52. In one embodiment, a worm shaft 58 may be coupled to and rotatable by the electric motor 56. The worm shaft 58 may be engaged with the worm gear 54 to form a worm drive. In operation, the electric motor 56 may rotate the worm shaft 58, which may in turn engage and rotate the worm gear 54. The hub 52, which may be coupled to the worm gear 54, may apply a torque to the steering shaft.

In addition to the hub 52, gear 54, electric motor 56, and worm shaft 58, the assembly may include several other components. A housing 60 may at least partially surround components of the assembly 51, such as the hub 52 and the worm shaft 58. A locking disk 62 may be included, as well as a locking device 64, such as a solenoid. The locking solenoid may allow the torque from the steering wheel (e.g., applied by the driver) to pass through the system directly to the hub 52 when the motor 56 is not powered. If the motor is unpowered and the system is not locked, turning the steering wheel may only turn the motor, not the hub. Accordingly, the locking disk 62 and locking device 64 may effectively allow a mechanical connection by neutralizing the AFS system.

The assembly 51 may include a controller 66, which may be referred to as an electronic control unit (ECU). While a single controller 66 is shown, there may be multiple controllers and the functions performed by the controller 66 described herein may be divided among multiple controllers. If there are multiple controllers, they may be in communication with each other and/or with the vehicle CAN. The controller 66 may, among other functions, control the electric motor 56 (e.g., speed and/or torque) and send and receive data therefrom. The controller 66 may include or be in communication with sensors related to the electric motor 56. For example, the controller 66 may be in communication with current sensors that measure the current provided to or drawn by the electric motor 56. The controller 66 may also be in communication with additional sensors related to the steering wheel assembly, such as a steering wheel angle sensor (e.g., located in the clock spring module, described below). The controller 66 may be configured to communicate with a vehicle controller area network (CAN), or other network in the vehicle, and send/receive data or signals therefrom. The controller 66 may have one or more connection ports to receive wires, cables, or other electronic connections.

A clock spring module 68 may be included in the assembly. As known to those of ordinary skill in the art, a clock spring module may be an assembly that allows the steering wheel to be turned while maintaining an electrical connection to the components like the airbag, horn and other electrical steering wheel mounted controls. The module may contain, for example, a spirally wound flat ribbon. The clock spring module 68 may communicate power and/or communications/data (send/receive) to the controller 66. The clock spring module 68 may have one or more connections or ports to transmit the power and/or communications (e.g., CAN connection(s)).

In order to work efficiently, effectively, and/or robustly, it may be important to ensure that the friction of/between the components in the steering wheel assembly and adaptive steering system is within a certain window. For example, if the friction is too low, the system reaction may be faster than desired and if the friction is too high, the system reaction may be slower than desired or delayed. Both situations may degrade steering performance. The friction in the system may be represented by the amount of torque necessary to rotate the hub 52 (e.g., while not coupled/fixed to the steering shaft). Accordingly, prior to releasing the steering assembly from production, it may be important to test the friction in the system to determine whether it is within the desired window.

Figure 3:
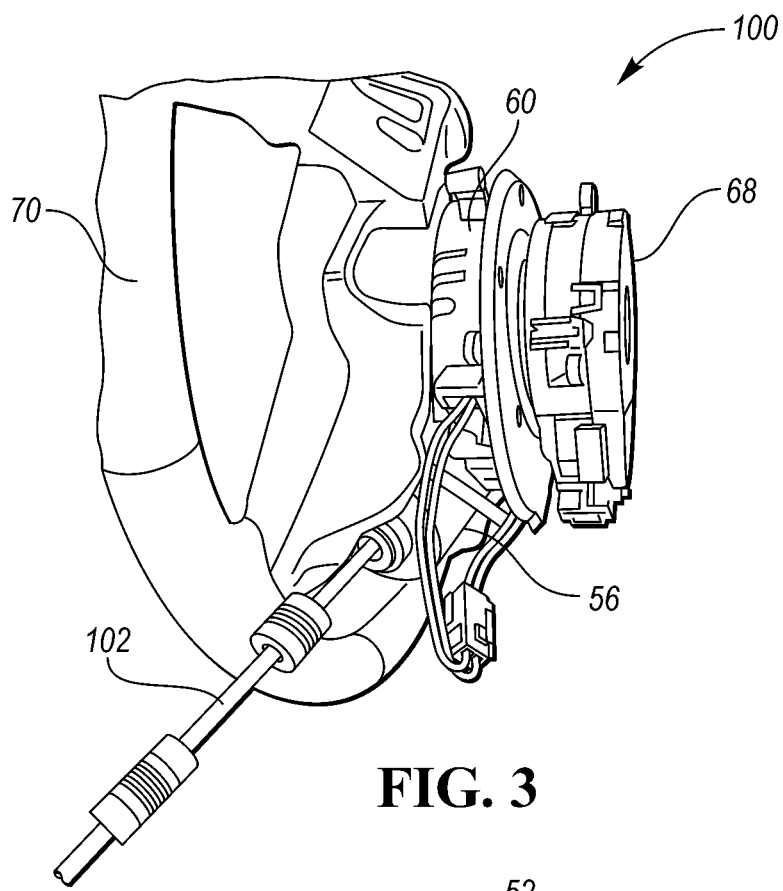
FIG. 3 is a side perspective view of a steering wheel assembly of an adaptive steering system engaged with an external rotational driver, according to an embodiment.

With reference to FIG. 3, one approach to testing the friction of the system may be to use external equipment to measure the torque required to rotate the hub. The steering wheel assembly 100 shown in FIG. 3 may be similar to the assembly 51 shown in FIG. 2. Some internal components from the assembly 51 are hidden in the partially assembled assembly 100, however, the electric motor 56, the housing 60, and the clock spring module 68 can be seen, in addition to the steering wheel 70.

In this embodiment, an external rotational driver 102 may be coupled to the electric motor 56. A different, external motor (not shown), such as another electric motor, may be used to drive the external rotational driver 102 to remotely turn the electric motor 56 and, therefore, the hub (e.g., while not coupled/fixed to the steering shaft). An external torque sensor may be connected or coupled to the external motor and/or the external rotational driver 102 to measure the torque required to turn the hub. The torque may be measured directly or calculated as a function of electric motor current. As used herein, components that are "external" are those that will not be part of the assembled steering assembly when it is installed in a vehicle. Accordingly, the external electric motor and the external rotational driver are components that are only connected or coupled to the steering wheel assembly 100 during certain stages of an assembly process.

The torque may be measured as a function of the hub angle. The curve of the torque value may be analyzed to determine whether it stays within a predetermined torque window. The comparison may be based on an average torque value, the minimum/maximum torque value, or other values derived from the torque curve.

The external torque analysis process described above may be performed during certain stages of the steering system/vehicle assembly process. In particular, the process may only be carried out when the internal electric motor of the steering system is exposed and accessible so that it can be connected to the external motor and the external rotational driver. Accordingly, the analysis may be limited to relatively early assembly stations on the assembly line and may not be possible at the end of line station when the steering assembly is completed and enclosed. In addition to limitations on when the process can be performed, the external analysis approach also has drawbacks such as increased equipment and associated costs (additional electric motor, sensors, driver) and increased cycle time (e.g., time to attach/connect external components (motor, sensors, etc.) to the steering assembly).

Figure 4:
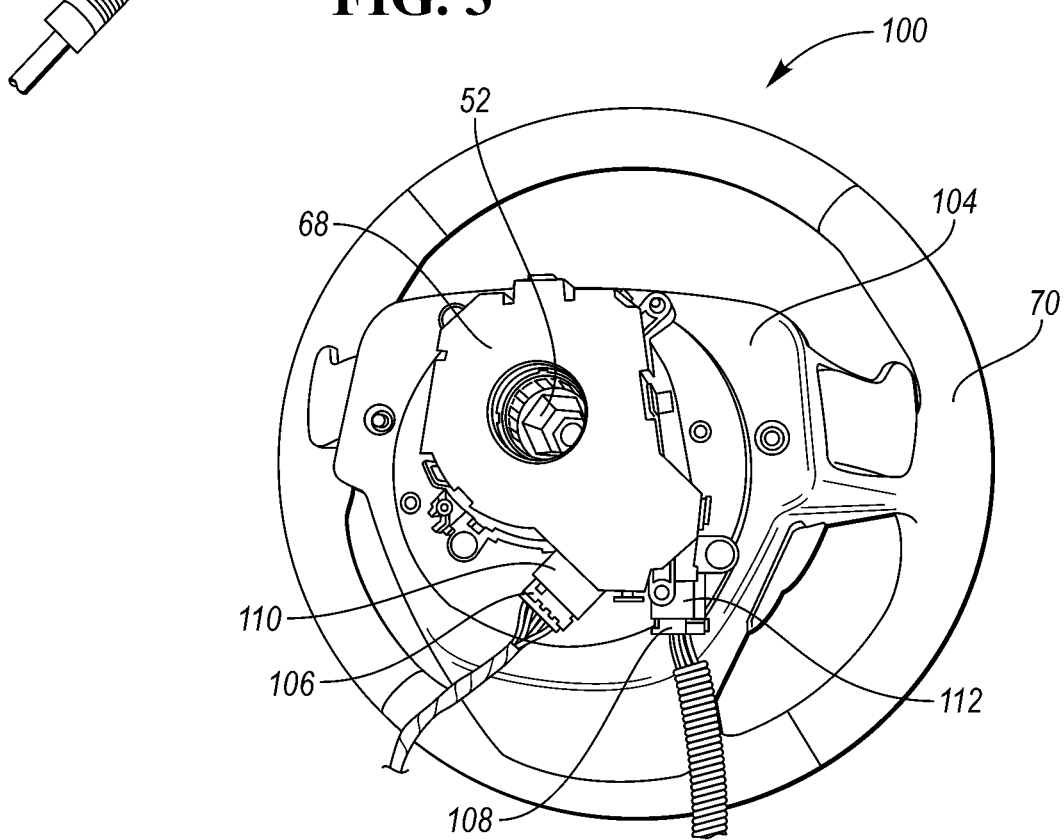
FIG. 4 is a rear perspective view of an assembled and enclosed steering wheel assembly of an adaptive steering system, according to an embodiment.
Figure 5:
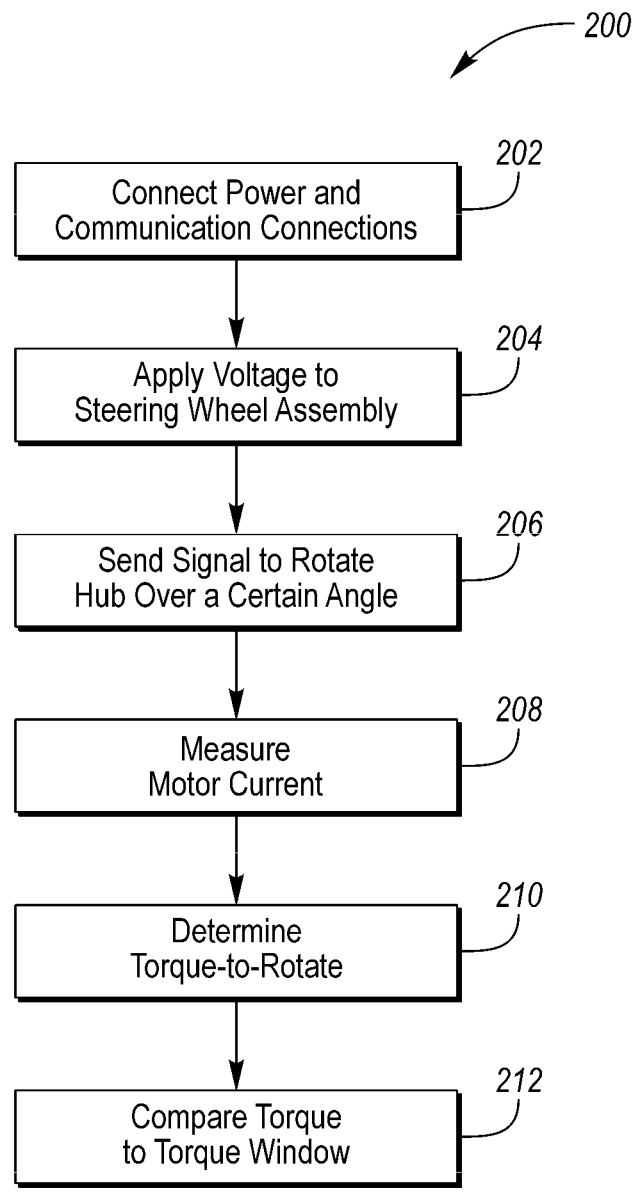
FIG. 5 is an example flowchart for a method of analyzing the torque-to-rotate of an adaptive steering system, according to an embodiment.

With reference to FIGS. 4 and 5, systems and methods are disclosed for assessing the torque/friction of the adaptive steering system with the steering wheel assembly enclosed/assembled. FIG. 4 shows the steering wheel assembly 100 with a cover or housing 104 attached to the steering wheel to hide and enclose the electric motor 56 and other internal components of the assembly. Accordingly, as described above, in the assembled/enclosed state, it is not possible to access the electric motor 56 or to engage or couple it to an external rotational driver 102. Electrical connections 106 and 108 may be coupled to the assembly, for example, via ports 110 and 112 in the clock spring module 68. Each of these connections may transmit power to the assembly (e.g., to the ECU and the electric motor) and/or may transmit and receive electrical signals to/from the ECU and any sensors in the assembly, such as control signals or data (e.g., sensor data). At least one of the ports 110 and 112 may be configured to receive commands and exchange data with the vehicle CAN.

It has been discovered that the internal electric motor 56 of the assembly 51 may be used to perform the friction/torque analysis without the use of an external motor or rotational driver. This may allow the adaptive steering system to be tested when the steering wheel assembly is fully assembled and/or when the internal electric motor is covered or otherwise inaccessible. This may allow greater flexibility in the timing and location of the torque/friction testing, while also reducing the equipment, cost, and/or time to perform the testing. For example, the system may be tested at an end of line (EOL) assembly station when the steering wheel assembly is completely assembled. This may allow for a final check of the friction/torque with all or most of the relevant components installed and part of the testing procedure. In addition, this procedure may allow new data to inform previous processes. For example, previous processes which may affect the internal friction of the system may be adjusted and improved based on the new data which provides a picture of the EOL friction.

With reference to FIG. 5, an example of a flowchart for a torque/friction test method 200 is shown. This method is merely an example, and it should be understood that each step in the process may not be necessary, that steps may be performed in a different order than shown or may be performed simultaneously, or that additional steps may be included. In step 202, the steering wheel assembly may be connected to a power source and a communications source. The power source may be an external power source which may, for example, be part of a vehicle assembly line. In other embodiments, if the steering assembly is connected to a vehicle power source, such as the vehicle battery, then the vehicle power source may provide power to the steering assembly. In addition to providing power to the steering assembly, electronic communication may be established with the steering assembly. Both the power and communication may be provided via one or more cables or wires, such as those shown in FIG. 4. The cables/wires may be bundled together and have one or more electrical connections or plugs. At least one of the connections/plugs may be configured to send control/command signals to the steering wheel assembly and to exchange data therewith. In one embodiment, the connection/plug may use the vehicle CAN port and may simulate or replace the connection to the vehicle CAN.

In step 204, a voltage may be applied to the steering wheel assembly to power the electronic components therein, such as the electric motor, the ECU (and/or other controllers), any sensors, or other components. In at least one embodiment, the voltage may be a preconditioned voltage. Applying a preconditioned voltage may be defined as providing the voltage that the system is designed to operate on. In one embodiment, the system is designed to run in the vehicle at the voltage provided by the vehicle electrical systems. Therefore, when powering the system externally, the power may be provided at a voltage comparable to the voltage it receives in the vehicle (e.g., about 13V). If higher/lower voltage was applied, there may be performance degradation, which may take the system out of normal operating conditions and/or influence the results of the test.

In step 206, a signal or command may be sent to the internal electric motor to rotate the hub of the adaptive steering system over a certain angle. The hub angle may be the same as an angle of the worm gear coupled to the hub, and the two angles are used interchangeably herein. The signal or command may be sent via the vehicle CAN communication gateway. In one embodiment, the signal may be sent from an external source, such as a computer or controller in the vehicle assembly line. As described above, the signal may be sent via a connection that plugs into a port in the clock spring module. The signal may be received by the ECU in the steering assembly, which may in turn control the electric motor to carry out the hub rotation. The rotation may be performed by actuating the electric motor to rotate a worm drive, which then turns a worm gear coupled to the hub. In one embodiment, the hub may be rotated without a shaft inserted or coupled to the hub. This may allow for testing of the friction in the adaptive steering system only.

The electric motor may rotate the hub over a certain angle, which may be measured in degrees. The signal may also include a time over which the hub rotation is to take place or a speed of rotation. The rotation speed (e.g., angle per unit time) may be constant, however this is not required. In one embodiment, the electric motor may be instructed to rotate the hub at least one full rotation. For example, the electric motor may rotate the hub one full rotation (360 degrees) clockwise (CW) or counter-clockwise (CCW). In another embodiment, the electric motor may rotate the hub at least one full rotation in each direction. For example, the electric motor may rotate the hub one full rotation (360 degrees) CW and then rotate the hub one full rotation CCW (e.g., back to the original location), or vice versa. In some embodiments, the hub may be rotated less than a full rotation in one or both directions, while in others the hub may be rotated more than a full rotation in one or both directions (e.g., 2, 3, or more rotations). In one embodiment, the hub may be rotated at least 10 degrees by the electric motor in one or both directions, for example, at least 30, 45, 60, 90, 135, 180, or 270 degrees. If the hub is rotated in a first direction and then in a second, opposite direction (e.g., CW then CCW, or vice versa), then the hub may be rotated by the same angle in each direction. However, in certain embodiments, the angle may be different for each direction. In one example, the motor may be signaled to run two full rotations of the hub both CW and CCW at a constant speed. A short pause may be included on either end for run up and run down.

In step 208, the current required by the electric motor to rotate the hub in step 206 is measured. The current may be measured as a function time and may be plotted as a function of hub angle. These data points may therefore be used to generate a curve or plot of the current draw of the electric motor over the hub angle range. The current may be measured by one or more current sensors. The sensors may be integrated with the electric motor and/or the ECU, or they may be separate sensors that are in communication with the electric motor and ECU.

In step 210, the torque applied to rotate the hub in step 206 may be determined, which may be referred to as the torque-to-rotate. In an electric motor, the torque produced may be proportional to the current flowing through the motor. Accordingly, if the current draw of the electric motor is measured while the electric motor is rotating the hub, the torque during the rotation may be determined or calculated. The torque may be calculated at each current data point to generate a plurality of torque data points over the hub angle range. The torque over the predetermined hub angle may therefore be used to generate a curve or plot of torque vs. hub angle. The calculation of the torque may be performed in the steering assembly ECU (or another vehicle controller) or externally. For example, a controller or computer on or connected to the assembly line may perform the calculations, which may be the same controller/computer that sent the signal to the electric motor to rotate the hub (but not necessarily). However, the torque calculations may also be performed by an off-site computer or computers. If the torque data is generated by a vehicle controller (e.g., ECU), the data may be sent to an external controller/computer after it is generated for analysis. The external computer may be part of the assembly line, but it may also be off-site.

In step 212, the torque values calculated/determined in step 210 may be analyzed to determine whether they represent a system friction that is acceptable. As described above, the amount of friction in the steering assembly may be represented by, or proportional to, the amount of torque necessary to rotate the hub. A certain range of friction/torque may be deemed acceptable for the operation, performance, and/or longevity of the adaptive steering system. Accordingly, a torque window may be identified that represents a minimum and maximum torque value for the steering system to be considered within specification.

The torque of the electric motor may oscillate up and down as the hub is rotated across the pre-defined hub angle. Accordingly, the comparison of the calculated torque to the torque window may be determined in several ways. In one embodiment, the torque-to-rotate may be averaged across the hub angle to give a single representative torque value. This average/mean torque may then be compared to the torque window to see if it is between the minimum and maximum torque values of the window. In another embodiment, the minimum and maximum torque values may be identified from the hub rotation and these values may be compared to the torque window to see if they fall within the window min/max. If multiple torque values are compared to the torque window, then whether the steering assembly meets or fails to meet the specification may be determined in several ways. For example, the specification may require that all torque values are within the torque window or that at least a certain number/percentage are within the window.

The minimum and maximum torque values of the torque window may vary depending on the particular adaptive steering system involved. The min/max values may be experimentally determined or calculated. In at least one embodiment, it may be desired or necessary that the minimum and maximum torque values stay within a certain range or window. The size or magnitude of the window may be calculated as the maximum value minus the minimum value (e.g., $T_{win} = T_{max} - T_{min}$). In one embodiment, the size or magnitude of the torque window may be no more than 250 N·mm, for example, no more than 200 N·mm or 150 N·mm.

Figure 6:
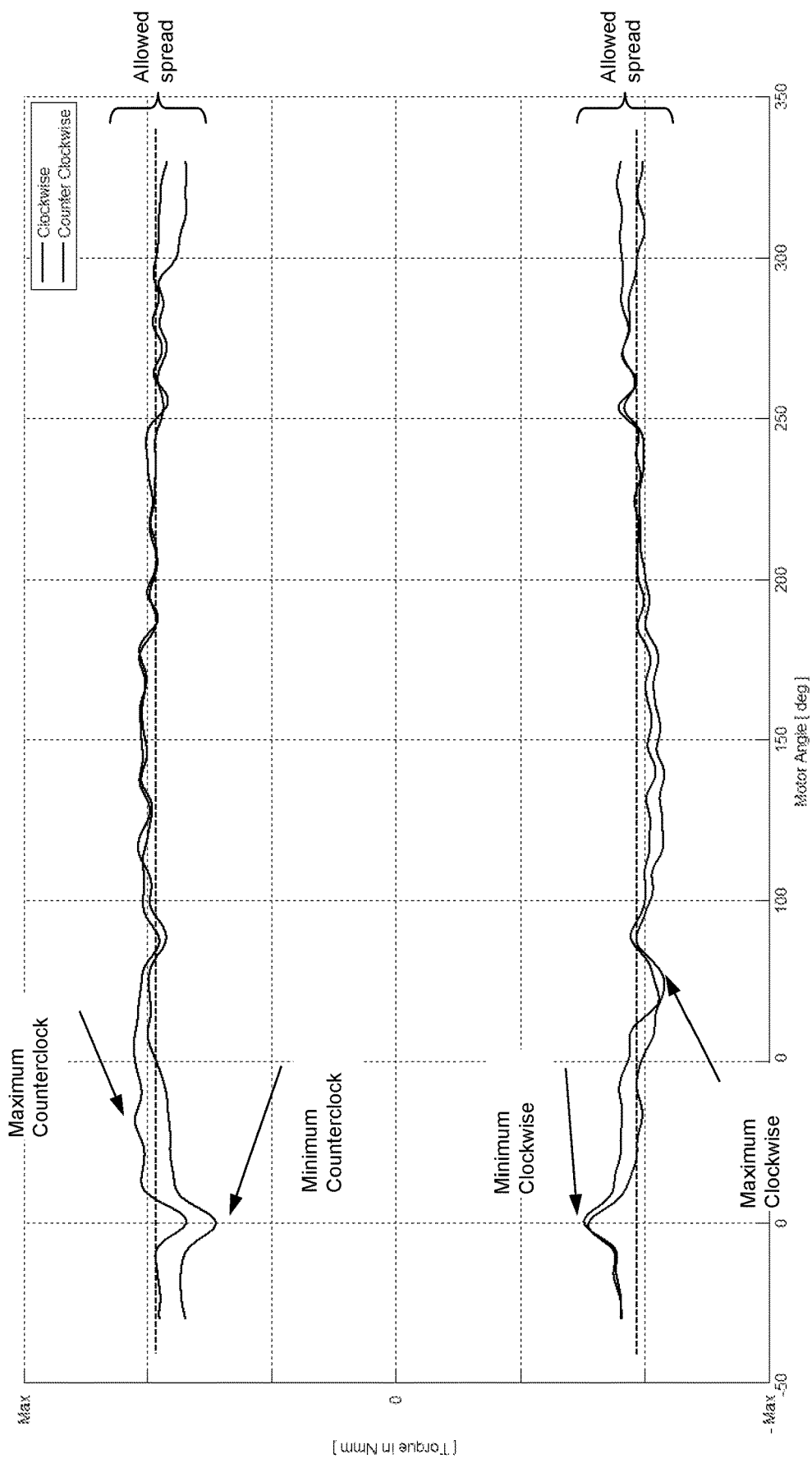
FIG. 6 is an example of experimental torque-to-rotate data for a full hub rotation in the counter-clockwise and clockwise directions.

With reference to FIG. 6, example torque-to-rotate data is shown for a torque/friction test according to the disclosed methods using the internal electric motor of the steering assembly. As shown, the internal electric motor rotated the hub through full rotations of 360 degrees (−30 to 330) in both the counter-clockwise (CCW, top) and clockwise (CW, bottom) directions. The hub was rotated through two full rotations in each direction (alternating). An average/mean torque line is drawn through the curves to show the average torque value and the minimum and maximum torque points for each direction are indicated. As shown, and described above, the torque required to rotate the hub oscillates up and down throughout the hub rotation. The torque values in the two directions may not be the same for the same hub angle, as shown.

Systems and methods of testing and analyzing an adaptive steering system assembly are disclosed. The systems and methods may be used to analyze the friction in the steering system by measuring or calculating an amount of torque required to rotate the hub and associated gears in the steering system. The friction analysis may be carried out using an internal electric motor in the steering assembly, the same electric motor which operates the adaptive steering system in the fully assembled vehicle. This may allow the analysis to be performed with the steering assembly fully completed and enclosed (e.g., without external rotating drive units). Performing the tests with the assembly enclosed may in turn allow the analysis to be performed later in the assembly/production process, such as at an end of line (EOL) station. In contrast, other analysis methods, such as those using an external rotational driver, may have to be performed with the steering assembly open and accessible. This may require the tests to be run earlier in the production process.

While the systems and methods are disclosed and described with reference to the assembly process, one or ordinary skill in the art will understand that the disclosed system and methods may be applicable in other situations or applications. For example, the systems and methods may be used in designing and engineering new systems or modifying existing ones. The systems and methods may also be used while setting or calibrating the components of the system, before or during the assembly process. The friction of the system may be tested or analyzed at multiple stages of assembly, for example, after an initial assembly and then again at or near then end of the assembly process (e.g., EOL). This may ensure that the friction levels are consistent and/or to identify if a component has shifted, misaligned, or otherwise changed during the assembly process such that the system friction has been affected.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of measuring a torque-to-rotate of an adaptive steering system, comprising:

sending a control signal to an internal electric motor to rotate a steering shaft hub over a predetermined range of hub angles with the internal electric motor enclosed by a steering wheel cover;
rotating the steering shaft hub configured to engage a steering shaft over the predetermined range of hub angles using a gear and the internal electric motor in response to the control signal;
determining a torque required to rotate the hub as a function of the hub angles; and
determining whether the torque is within a predefined torque window.

2. The method of claim 1, wherein the predefined torque window is based on a target overall friction in the adaptive steering system.

3. The method of claim 1, wherein determining the torque includes calculating the torque based on a current draw of the internal electric motor.

4. The method of claim 1, further comprising connecting, via an electrical connection, the internal electric motor to a power source external to the adaptive steering system prior to the rotating step to provide power to the internal electric motor.

5. The method of claim 4, wherein the control signal is sent via the electrical connection.

6. The method of claim 1, wherein the rotating step, the first determining step, and the second determining step are performed at an end-of-line (EOL) station on an assembly line.

7. The method of claim 6, wherein the adaptive steering system is fully assembled and enclosed during the rotating step, the first determining step, and the second determining step.

8. The method of claim 1, wherein the rotating step, the first determining step, and the second determining step are performed twice, first at an assembly station and second at an end-of-line (EOL) station on an assembly line.

9. The method of claim 1, wherein the rotating step includes rotating the hub at least one full rotation in a first direction.

10. The method of claim 9, wherein after rotating the hub in the first direction, the rotating step further includes rotating the hub at least one full rotation in a second, opposite direction.

11. The method of claim 1 further comprising, when the torque is not within the predefined torque window, generating an alarm or notification.

12. The method of claim 1, wherein the predefined torque window is from 50 to 140 N·mm.

13. An adaptive steering system, comprising:
an internal electric motor and a gear configured to rotate a hub configured to engage a steering shaft;
a steering wheel cover; and
one or more controllers configured to send a signal to the internal electric motor to rotate the hub over a predetermined range of hub angles with the internal electric motor enclosed by the steering wheel cover, determine a torque required to rotate the hub as a function of the hub angles, and determine of the torque is within a predefined torque window.

14. The system of claim 13, wherein the gear is a worm gear.

15. The system of claim 13, further comprising an external, non-vehicle power supply connected to the internal electric motor and configured to power the internal electric motor to rotate the hub.

16. The system of claim 13, wherein the one or more controllers are configured to send a signal to the internal electric motor to rotate the hub at least one full rotation in a first direction.

17. The system of claim 16, wherein after rotating the hub in the first direction, the one or more controllers are configured to send a signal to the internal electric motor to rotate the hub at least one full rotation in a second, opposite direction.

18. An adaptive steering control system, comprising:
one or more controllers configured to:
send a signal to an internal electric motor to rotate a steering shaft hub over a predetermined range of hub angles with the internal electric motor enclosed by a steering wheel over;
determine a torque required to rotate the steering shaft hub as a function of the hub angles; and
determine if the torque is within a predefined torque window.

19. The system of claim 18, wherein the one or more controllers are configured to send a signal to the internal electric motor to rotate the hub at least 30 degrees in a first direction and then to rotate the hub at least 30 degrees in a second, opposite direction.

20. The system of claim 18, wherein the one or more controllers are configured to send a signal to the internal electric motor to rotate the hub at least one full rotation in a first direction.

* * * * *